(12) United States Patent
Park

(10) Patent No.: US 6,813,156 B2
(45) Date of Patent: Nov. 2, 2004

(54) COMPUTER SYSTEM AND A COMBINING STRUCTURE FOR A POWER SUPPLYING UNIT FOR A COMPUTER SYSTEM

(75) Inventor: Yong-Hwan Park, Suwon (KR)

(73) Assignee: Samsung Electronics Co., LTD, Suwon (KR)

( * ) Notice: Subject to any disclaimer, the term of this patent is extended or adjusted under 35 U.S.C. 154(b) by 4 days.

(21) Appl. No.: 10/139,509

(22) Filed: May 7, 2002

(65) Prior Publication Data

US 2002/0196600 A1 Dec. 26, 2002

(30) Foreign Application Priority Data

Jun. 21, 2001 (KR) .......................................... 2001-35476

(51) Int. Cl.[7] ................................................. H05K 7/16
(52) U.S. Cl. ....................... 361/725; 361/721; 361/683; 312/223.1; 312/223.2
(58) Field of Search ................................. 361/610, 683, 361/725–729, 741; 312/223.1, 223.2

(56) References Cited

U.S. PATENT DOCUMENTS

| 5,495,389 | A | * | 2/1996 | Dewitt et al. ............... 361/683 |
| 5,713,647 | A | | 2/1998 | Kim |
| 5,774,330 | A | | 6/1998 | Melton et al. |
| 5,781,410 | A | | 7/1998 | Keown et al. |
| 5,784,251 | A | | 7/1998 | Miller et al. |
| 6,000,767 | A | | 12/1999 | Liu et al. |
| 6,215,664 | B1 | * | 4/2001 | Hernandez et al. ......... 361/725 |
| 6,430,041 | B1 | * | 8/2002 | Johnson et al. ............. 361/687 |
| 6,549,397 | B1 | * | 4/2003 | Diaz et al. .................. 361/683 |

FOREIGN PATENT DOCUMENTS

| JP | 10-293625 | 11/1998 |
| KR | 1989-5421 | 4/1989 |
| KR | 1995-9817 | 4/1995 |
| KR | 1996-35207 | 11/1996 |
| KR | 1998-49755 | 10/1998 |
| KR | 1998-67687 | 12/1998 |
| KR | 1999-12569 | 4/1999 |
| KR | 1999-41085 | 12/1999 |
| KR | 2001-27046 | 5/2001 |

OTHER PUBLICATIONS

U.S. patent application Ser. No.—to be assigned– to Seog Bang et al., entitled COMPUTER, filed on May 2, 2002.

* cited by examiner

Primary Examiner—Darren Schuberg
Assistant Examiner—Anthony Q. Edwards
(74) Attorney, Agent, or Firm—Robert E. Bushnell, Esq.

(57) ABSTRACT

A computer system is provided that includes a casing and a power supplying unit combined to the casing, a pair of guiding projections protruding from opposite sides of the power supplying unit, a pair of guiding members accommodating the pair of guiding projections and guiding the power supplying unit from a released position to a combining position, a stopper provided in at least one of the two guiding members and preventing the power supplying unit from separating beyond the released position, and a supporter supporting the power supplying unit, together with the stopper, when the power supplying unit is opened by rotating through a predetermined angle. With this configuration, the computer system provides a combining structure for a power supplying unit, in which hardware components can be easily cabled, exchanged, and repaired.

19 Claims, 11 Drawing Sheets

COMPUTER SYSTEM AND A COMBINING STRUCTURE FOR A POWER SUPPLYING UNIT FOR A COMPUTER SYSTEM

CLAIM OF PRIORITY

This application makes reference to, incorporates the same herein, and claims all benefits accruing under 35 U.S.C. §119 from my application A COMPUTER IMPROVED IN THE COMBINING STRUCTURE OF A POWER SUPPLYING UNIT filed with the Korean Industrial Property Office on Jun. 21, 2001 and there duly assigned Ser. No. 35476/2001.

BACKGROUND OF THE INVENTION

1. Field of the Invention

The present invention relates in general to a computer system and, more particularly, to a computer system including a combining structure for a power supplying unit.

2. Description of the Related Art

A multi-functional computer has been developed, and hardware therefor has been steadily improved. Change is required for not only software but also hardware. Thus, the structure of a computer is so designed as to meet needs of an end user and needs of a manufacturer.

A power supplying unit provided in a general desktop computer and supplying electric power to every hardware component of the general desktop computer is spaced from a main board by a predetermined distance and placed at an inner upper part of a rear plate in a casing by means of a fastening screw. Thus, the power supplying unit for the desktop computer does not encumber the hardware components such as the main board to be repaired or exchanged. However, there have been shortcomings that the desktop computer occupies a relatively large space and a procedure of assembling and disassembling the casing of the desktop computer is complicated.

Korean Patent Application No. 2001-27046 proposes a desktop computer occupying a relatively small space and having a casing which is simply assembled and disassembled, to overcome the shortcomings of the conventional desktop computer. The desktop computer of Korean Patent application No. 2001-27046 includes a casing including a fixed casing and a movable casing equipped with at least one hardware component, and a movable member locking and unlocking the movable casing to the fixed casing. Therefore, such desktop computer has a relatively small casing, compared with the casing of the general desktop computer.

However, in the desktop computer of Korean Patent application No. 2001-27046, it can be inconvenient to exchange or repair the hardware components, such as a main board, because a power supplying unit fastened on the casing by means of fastening screws must be removed every time the hardware components are exchanged or repaired. Moreover, it is not easy to cable the hardware components for electric power because the hardware components are hidden by the power supplying unit.

SUMMARY OF THE INVENTION

Accordingly, the present invention has been made keeping in mind the above-described user's need, and an object, among other objects, of the present invention is to provide a computer system including a combining structure for a power supplying unit, in which hardware components can be easily cabled, exchanged, and repaired.

In this regard, the present invention provides a computer system including a casing and a power supplying unit, the power supplying unit being combined to an inside of the casing, including: a pair of guiding projections respectively extending from opposite sides of the power supplying unit; a pair of guiding members including a pair of sliding guides for guiding the power supplying unit from a released position to a combined position with the casing, the pair of guiding members for accommodating the pair of guiding projections; a stopper provided in at least one of the guiding members for preventing the power supplying unit from separating from the casing beyond the released position; and a supporter, together with the stopper, for supporting the power supplying unit, when the casing is open in an open position and the power supplying unit has rotated through a predetermined angle in or at the released position.

The supporter includes a wall of the casing and supports a bottom of the power supplying unit when the casing is opened and the power supplying unit has rotated through a predetermined angle in the released position.

Preferably, the computer system further includes at least one of the sliding guides being a curved sliding guide including a plurality of curves at the released position, the stopper being formed by the curved sliding guide of at least one of the sliding guides.

Further, at least one of the sliding guides includes a slot provided on a corresponding one of the guiding members.

Preferably, the computer system further includes at least one fastening bracket provided on the power supplying unit; and an aperture provided on the casing, the aperture being located at a position corresponding to a position of the fastening bracket for combining the casing with the fastening bracket by a fastening means, such as a fastening screw, at a combining position for the power supplying unit and the casing.

Preferably, the computer system further includes a power supplying unit holder positioned on an inside of the casing in spaced relation from the guiding members by a distance corresponding to the size of the power supplying unit for preventing the power supplying unit from moving when combined with the casing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENTS

Preferred embodiments of the present invention will now be described in more detail with reference to the accompanying drawings.

Figure 1:
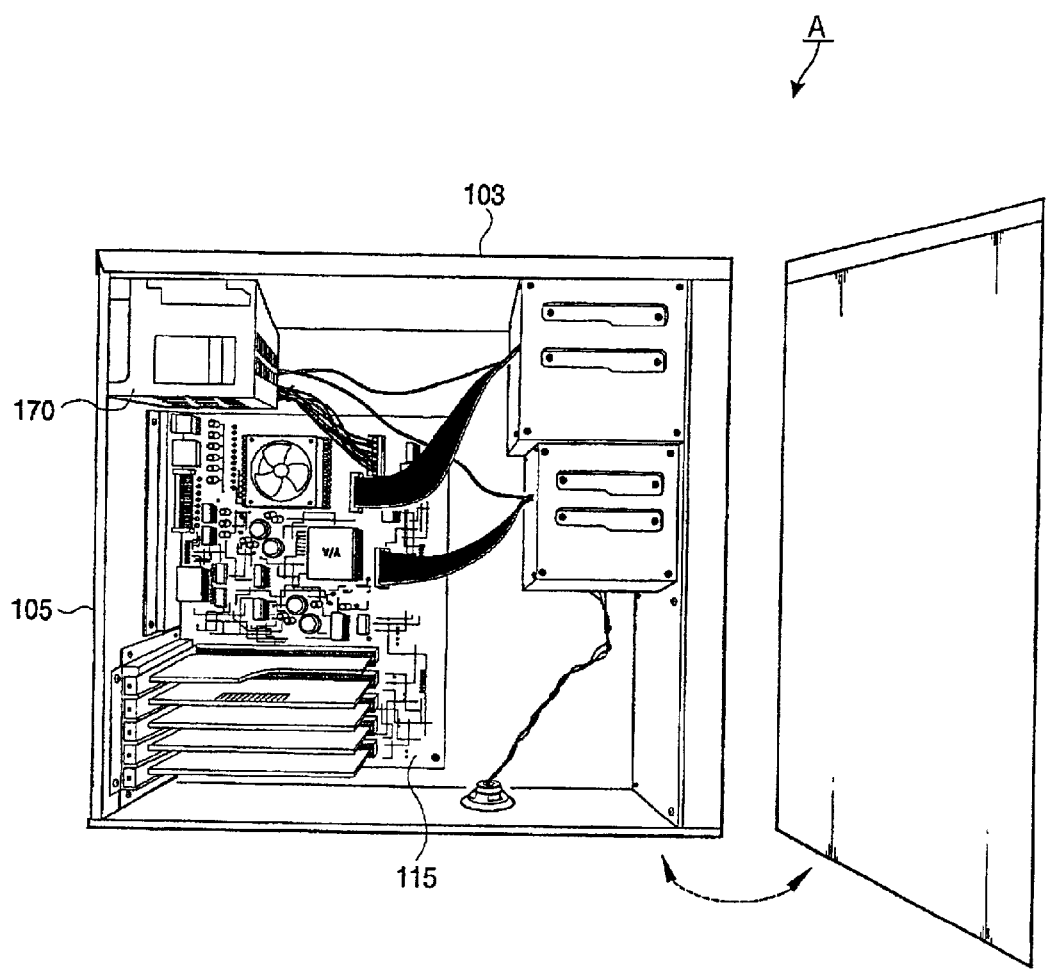
FIG. 1 is a side open perspective view of a computer system exemplary of contemporary practice in the art.

Referring to FIG. 1, a power supplying unit 170 provided in a general desktop computer A for supplying electric power to hardware components of the general desktop computer A is spaced from a main board 115 by a predetermined distance and placed at an inner upper part of a rear plate 105 in a casing 103 by means of a fastening screw (not shown). Thus, the power supplying unit 170 for the general desktop computer A does not encumber the hardware components such as the main board 115 to be repaired or exchanged. However, a potential problem of the general desktop computer A of FIG. 1 is that the general desktop computer A occupies a relatively large space and a procedure of assembling and disassembling the casing 103 of the general desktop computer A is typically complicated.

Figure 2:
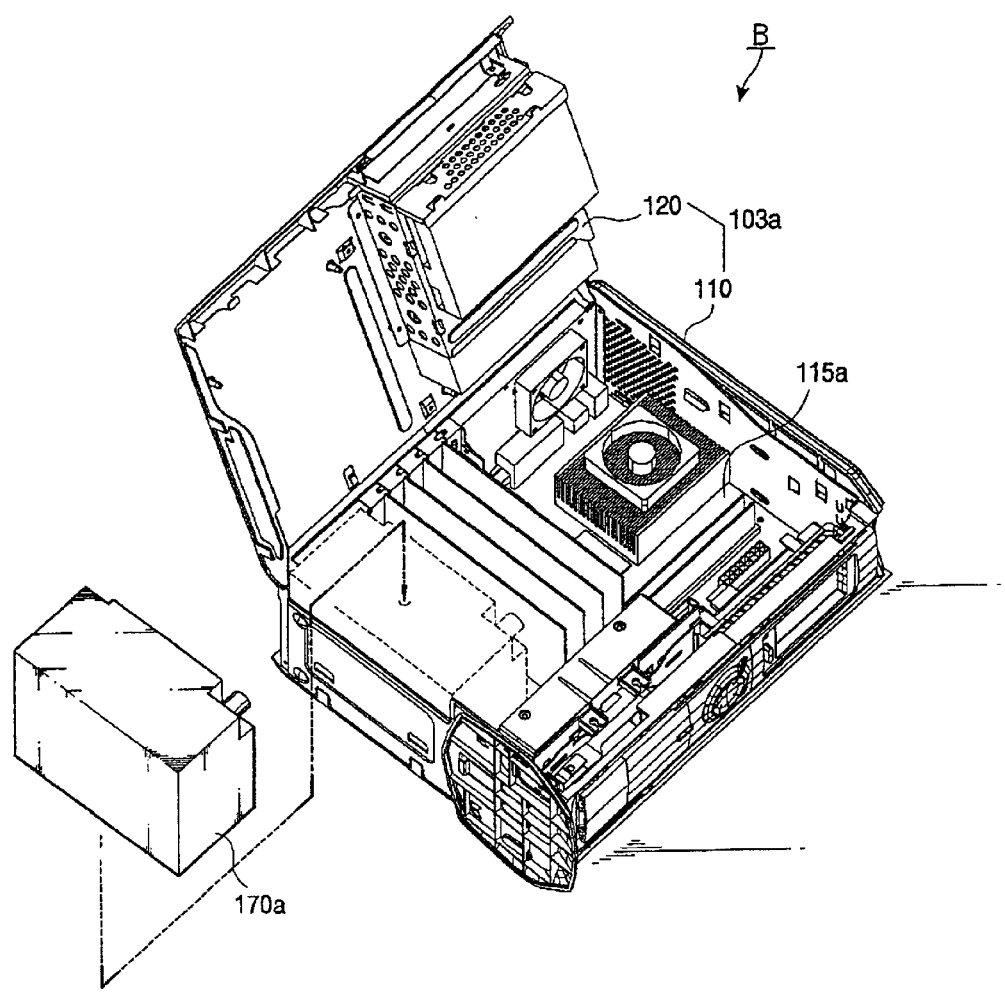
FIG. 2 is an exploded perspective view of an exemplary computer system.

Referring now to FIG. 2, Korean Patent Application No. 2001-27046, proposes a desktop computer B that occupies a relatively small space and including a casing which can be simply assembled and disassembled, to overcome the above described potential problem of a conventional desktop computer. As shown in FIG. 2, the desktop computer B of the Korean Patent Application No. 2001-27046 includes a casing 103a including a fixed casing 110 and a movable casing 120 equipped with at least one hardware component, and a movable member (not shown) for locking and unlocking the movable casing 120 to the fixed casing 110. Therefore, the desktop computer B has a relatively small casing 103a, compared with the casing 103 of the general desktop computer A of FIG. 1.

However, in the desktop computer B of FIG. 2, it can be inconvenient to exchange or repair the hardware components, such as a main board 115a, because a power supplying unit 170a fastened on the casing 103a by means of fastening screws must be removed every time the hardware components are exchanged or repaired. Moreover, it generally is not easy to cable the hardware components for electric power because the hardware components typically are hidden by the power supplying unit 170a.

Figure 3:
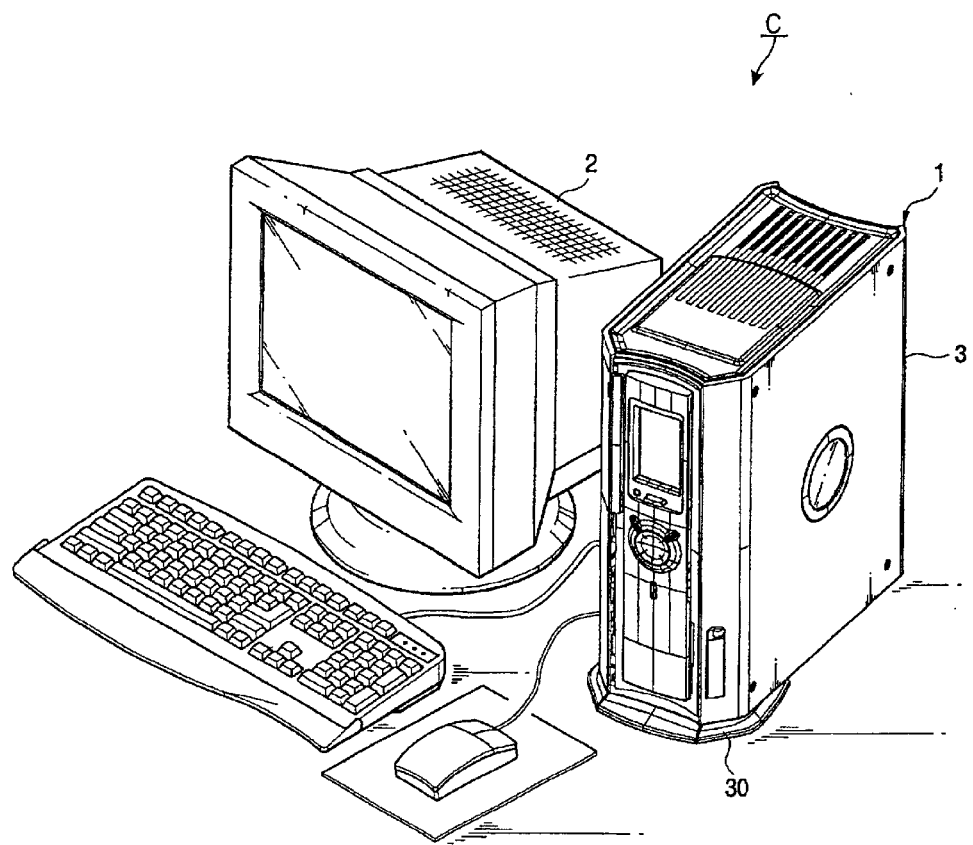
FIG. 3 is a perspective view of a computer system according to the present invention.

Referring now to FIG. 3, a computer system C according to the present invention is illustrated. Computer system C includes a casing 3 forming an outward appearance of a personal computer 1, and a monitor 2 displaying a picture signal transmitted from the personal computer 1.

Figure 4:
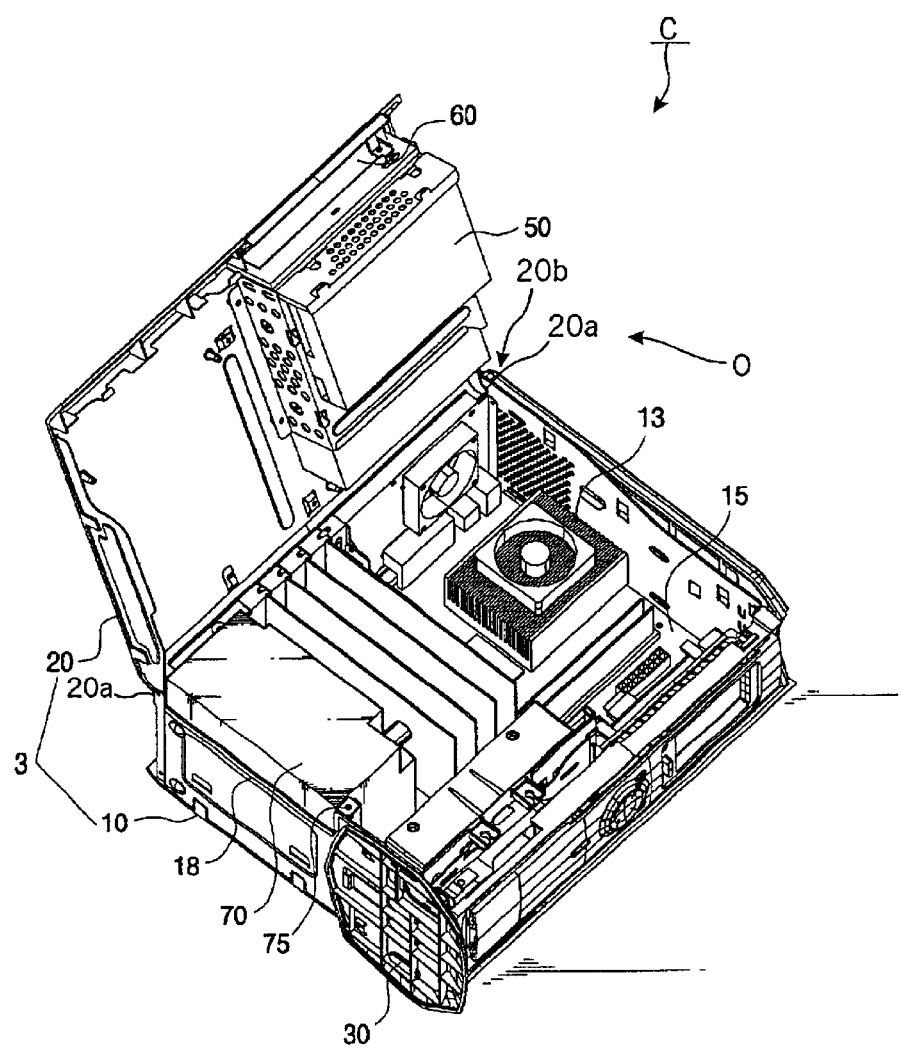
FIG. 4 is a perspective view of an opened casing of the computer system of FIG. 3.
Figure 5:
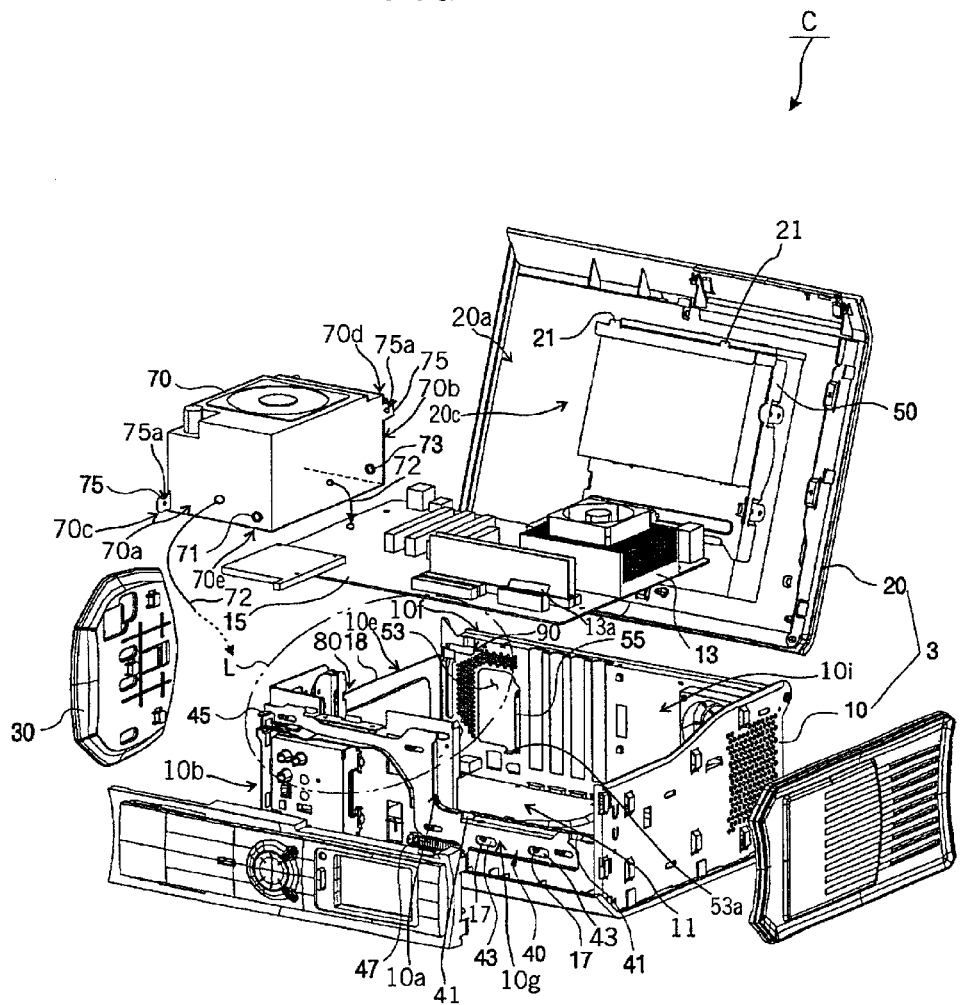
FIG. 5 is an exploded perspective view of the computer system of FIGS. 3 and 4 according to the present invention.

As shown in FIGS. 4 and 5, the casing 3 of the computer system C of FIG. 3 includes a fixed casing 10 accommodating a plurality of hardware components, such as a main board 15, and including an opening 11 provided at a side part 10a of fixed casing 10, a movable casing 20 covering the opening 11 and mounted with a hardware component on inner wall 20a of the movable casing 20, and a casing stand 30 provided at the bottom 10b of the fixed casing 10 and the movable casing 20 for supporting the casing 3.

Continuing with reference to FIGS. 3 through 5, in the fixed casing 10 is fixed the main board 15 on which a central processing unit 13, a random access memory (RAM) 13a, etc. are mounted. Further, in a part of the fixed casing 10 are provided a power supplying unit 70 supplying electric power to hardware components of the computer system C, such as the main board 15, and a supporter 18 supporting the power supplying unit 70 at a bottom or lower portion 70e when the power supplying unit 70 is opened by rotating the power supplying unit 70 through a predetermined angle.

In addition to a general structure of a conventional power supplying unit, referring to FIGS. 3 through 6, the power supplying unit 70, as shown in FIG. 5, further includes, according to the present invention, a pair of guiding projections, including a first guiding projection 71 and a second guiding projection 73, extended from opposite sides 70a, 70b of the power supplying unit 70, a fastening bracket or fastening brackets 75 respectively extending from the corners 70c, 70d of the power supplying unit 70 and including corresponding screw apertures 75a, corresponding to second and first screw apertures 16 and 86 provided at a respective edge 10c, 10d of the fixed casing 10, and power cables 72 extending from the power supplying unit 70 and respectively connected to hardware components of the computer system C, such as the main board 15, so as to supply electric power to the computer system C.

Continuing with reference to FIGS. 3 through 6, the pair of guiding projections 71 and 73 respectively slide along a pair of guiding members, the pair of guiding members including a first guiding member 80 and a second guiding member 90, thereby allowing the power supplying unit 70 to be selectively fastened to and removed from the fixed casing 10. When the power supplying unit 70 is mounted on the fixed casing 10 by guiding of the power supplying unit 70 by the pair of guiding projections 71 and 73, and the fastening brackets 75 each including a screw aperture 75a are placed on the screw apertures 16 and 86 of FIG. 6, then the fastening brackets 75 and the screw apertures 16 and 86 are combined with a fastening member, such as a fastening screw 100, at a combining position 101 (see also FIG. 8) and, therefore, the power supplying unit 70 is fixed on the fixed casing 10.

Figure 6:
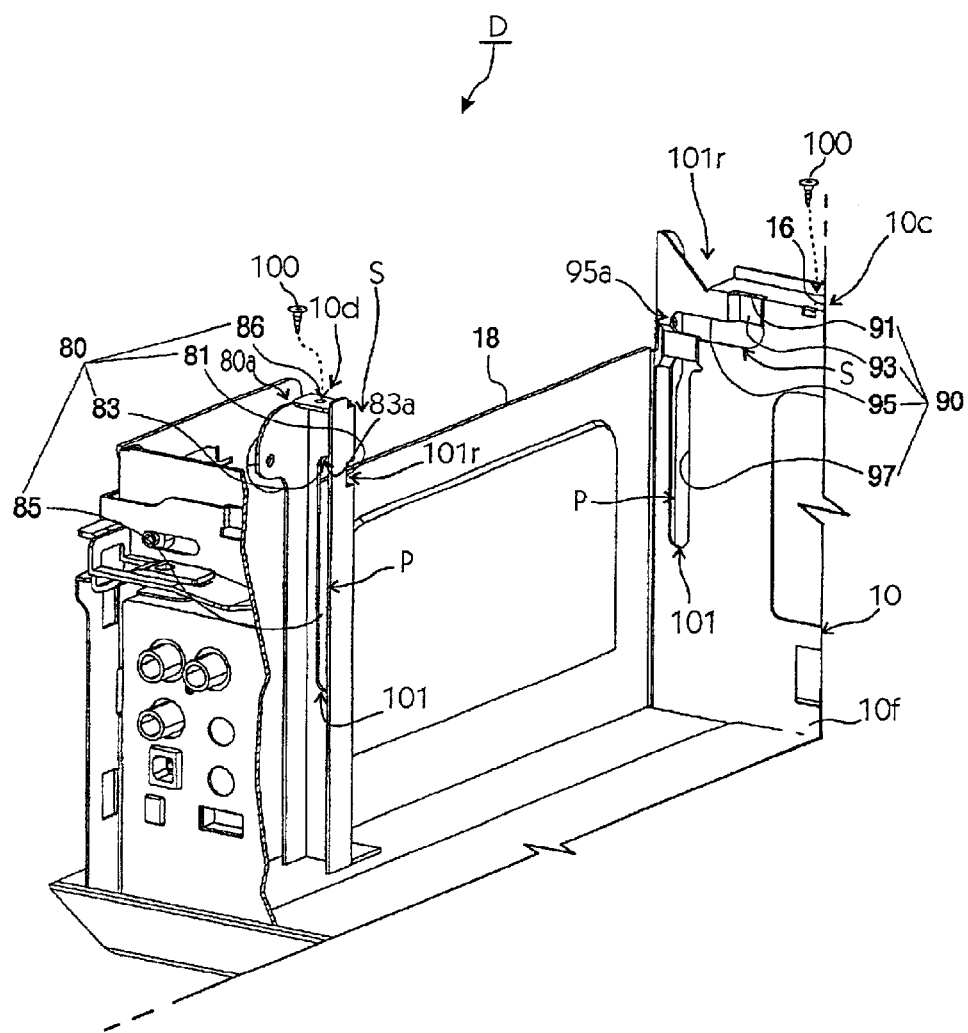
FIG. 6 is an enlarged view of the portion "L" of the computer system of FIG. 5.

As shown in FIGS. 5 and 6, the supporter 18 is provided at a side wall 10e of the fixed casing 10 so as to contact with and support the power supplying unit 70, together with a stopper 83a when the power supplying unit 70 is opened by rotating the power supplying unit 70 through a predetermined angle Z (FIGS. 8 and 9), in order to prevent the power supplying unit 70 from moving beyond a released position 101r. Thus, when a user moves the power supplying unit 70 to a position supported by the stoppers 83a, 95a and the supporter 18, the user can repair and exchange hardware components of the computer system C without completely removing the power supplying unit 70.

Referring to FIG. 5, in the fixed casing 10 there is provided a power supplying unit holder 55 which is bent inwardly or toward an interior portion 10i of the fixed casing 10 from an edge 53a of an opening 53 provided on the plate 10f of the fixed casing 10 around the power supplying unit 70 and keeps the power supplying unit 70 in place, i.e., from moving, when the power supplying unit 70 is fastened at the combining position 101 (FIG. 6) with the fixed casing 10, the power supplying unit holder 55 being spaced from at least one of the guiding members 80, 90 a distance corresponding to the size of power supplying unit 70.

On the front 10g of the fixed casing 10 are provided a plurality of bosses 17 protruding from the fixed casing 10. A movable member 40 (to be described later) employed as locking means is combined with the bosses 17. Further, the fixed casing 10 and the movable casing 20 are rotatably combined with each other by means of a hinge or hinges 20a (FIG. 4) at the rear opposite sides 20b of the movable casing 20.

Continuing with reference to FIGS. 4 and 5, the movable casing 20 includes a plurality of hook-holders 21 protruding from the front 20c of the movable casing 20 and being bent forward, and a cage 50 accommodating at least one hardware component. A plurality of hooks 41 of the movable member 40 are selectively locked and unlocked to the plurality of hook-holders 21, so that the movable casing 20 selectively covers and uncovers the fixed casing 10. The cage 50 accommodates therein a compact disc read only memory (CD-ROM) drive 60, and at the end part of the cage 50 are provided the plurality of hook-holders 21 being bent forward so as to be locked to the movable member 40, thereby locking the movable casing 20 to the fixed casing 10.

As shown in FIG. 5, the movable member 40 includes the hooks 41 to be selectively locked and unlocked to the hook-holders 21 of the movable casing 20, with elongated openings 43 being combined with the bosses 17 of the fixed casing 10, a grip 45 provided at one side of the movable member 40, and a coil spring 47 provided at a lower part of the front 10g of the fixed casing 10 and elastically biasing the movable member 40 in a reverse direction to the movement of the movable member 40. Thus, when the grip 45 of the movable member 40 is pulled in an outward direction of the casing 3, the coil spring 47 connected to the movable member 40 is lengthened, and the hooks 41 of the movable member 40 are released from the hook-holders 21 of the movable casing 20 and the cage 50, so that the movable casing 20 is opened from the fixed casing 10 to an open position as illustrated in FIG. 4, for example.

Continuing with reference to FIGS. 5 through 10, particularly FIGS. 5 and 6, further, in the fixed casing 10 is provided a combining arrangement D including the pair of guiding members 80 and 90 respectively including a pair of sliding guides 85 and 97 which accommodate the guiding projections 71 and 73 of the power supplying unit 70 and guides the power supplying unit 70 from the released position 101r to the combining position 101.

As shown in FIG. 6, the first guiding member 80, shaped like a bar, is separately made by an injection molding process and is fastened on the fixed casing 10 by means of welding, a rivet, etc., for example. The first guiding member 80 is positioned to the bottom 10b of the fixed casing 10, and the first guiding member 80 includes a first entrance 81 through which the first guiding projection 71 of the power supplying unit 70 is inserted, a first curved sliding guide 83 guiding the power supplying unit 70 from the first entrance 81 to the first sliding guide 85, the first sliding guide 85 guiding the power supplying unit 70 from the released position 101r to the combining position 101, and a first screw aperture 86 provided on a forward part 80a of the first guiding member 80.

Continuing with particular reference to FIGS. 5 and 6, the first curved sliding guide 83 is provided between the first entrance 81 and the first sliding guide 85, and is of a slot shape so as to guide the first guiding projection 71 inserted through the first entrance 81 to the first sliding guide 85. Further, the first curved sliding guide 83 is employed as and includes the stopper 83a or stopper arrangement which prevents the power supplying unit 70 from separating from the fixed casing 10. The first sliding guide 85 is slotted from the first curved sliding guide 83 to the combining position 101 of the power supplying unit 70, and guides the first guiding projection 71 of the power supplying unit 70 to the combining position 101 along the travelling path P. The first screw aperture 86 provided on the forward part 80a of the first guiding member 80 corresponds to a screw aperteur 75a of a corresponding fastening bracket 75 of the power supplying unit 70, and thus the power supplying unit 70 is respectively fastened to the fixed casing 10 by means of a corresponding fastening means, such as a fastening screw 75.

Continuing with reference to FIGS. 5 and 6, on the other hand, as shown in FIG. 6, the second guiding member 90 is positioned to the bottom 10b of the fixed casing 10 and guides the power supplying unit 70 to the combining position 101. The second guiding member 90 includes a second entrance 91 through which the second guiding projection 73 of the power supplying unit 70 is inserted, a second curved sliding guide 93 and a third curved sliding guide 95, providing a stopper arrangement, extending from the second entrance 91, and a second sliding guide 97 guiding the second guiding projection 73 of the power supplying unit 70 passing through the second and third curved sliding guides 93 and 95 to the combining position 101 along the travelling path P.

With further reference to FIGS. 5 and 6, the second curved sliding guide 93 is of a slot shape so as to guide the second guiding projection 73 inserted through the second entrance 91 to the second sliding guide 97. The second sliding guide 97 is in parallel relation with the first sliding guide 85 of the first guiding member 80 and guides the second guiding projection 73 inserted in the second sliding guide 97 to the combining position 101 of the power supplying unit 70. The third curved sliding guide 95 is provided between the second curved sliding guide 93 and the second sliding guide 97 and is of a slot shape so as to guide the second guiding projection 73 of the power supplying unit 70 to the second sliding guide 97. Further, the third curved sliding guide 95 is employed as and includes a stopper 95a which prevents the power supplying unit 70 from separating from the fixed casing 10, together with the stopper 83a of the first curved sliding guide 83 of the first guiding member 80.

With the above described combining structure including the combining arrangement D in fixed casing 10, in a computer system according to the present invention, such as computer system C, a process of selectively removing and combining the power supplying unit 70 with the fixed casing 10 of casing 3 in order to inspect, exchange, or repair the hardware components, such as the main board 15, will now be described, with particular reference to FIGS. 7 through 10, as well as FIGS. 4 through 6.

Continuing with reference to FIGS. 4 through 10, first, for the removing process, the movable member 40 combined with the fixed casing 10 is pulled in an outward direction of the fixed casing 10. At this time, the coil spring 47 connected to the movable member 40 is lengthened, and the hooks 41 of the movable member 40 are released from the hook-holders 21 of the movable casing 20 and the cage 50, so that the combination of the movable casing 20 and the fixed casing 10 is released.

Figure 7:
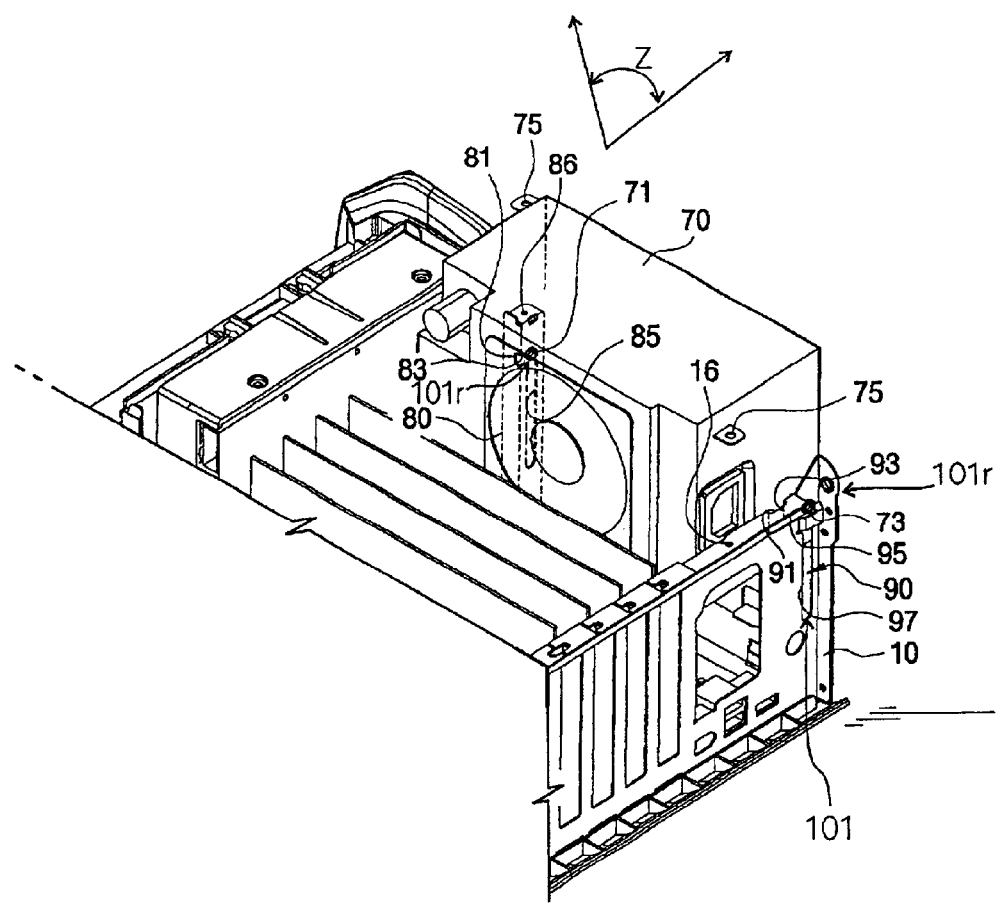
FIGS. 7 through 10 are perspective views of the computer systems of FIGS. 3 through 6 illustrating steps of a combining process for combining the power supplying unit with the casing in the computer system according to the present invention.

Thereafter, a user opens the casing 3 by turning the movable casing 20 around the hinges 20a of the fixed casing 10, and removes the fastening means, such as the fastening screws 100, from the power supplying unit 70 and the fixed casing 10, such as by using a screwdriver, for example. Next, the user lifts up the power supplying unit 70 which is bound by the fixed casing 10 along the first and second sliding guides 85 and 97 of the respective first and second guiding members 80 and 90, to a top position near the released position 10r. Thus, the power supplying unit 70 is moved to a position as shown in FIG. 7.

Figure 8:
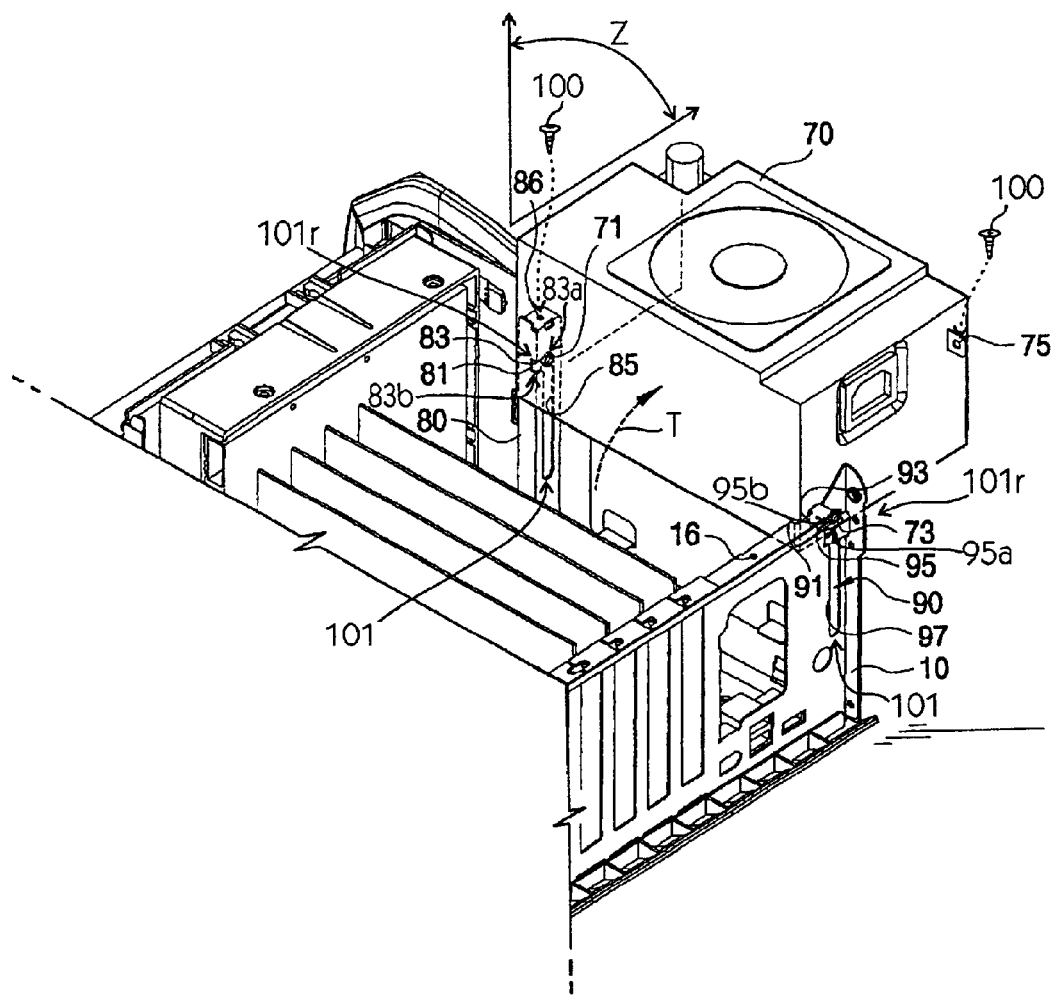

As shown in FIG. 8, when the user outwardly turns the power supplying unit 70 through the predetermined angle Z, such as by 90° clockwise, in the direction of the arrow T around the first and second guiding projections 71 and 73, the power supplying unit 70 is opened to the released position 101r. At this time, the power supplying unit 70 is prevented from moving beyond the released position 101r by means of the stoppers 83a, 95a formed by an inside wall 83b, 95b of the first and third curved sliding guides 83 and 95, respectively, and is also supported by the supporter 18 (FIGS. 5 and 6). Consequently, the user can easily inspect, repair, upgrade, exchange, and perform cabling of the hardware components, such as the main board 15, in the opening state of the power supplying unit 70.

Figure 9:
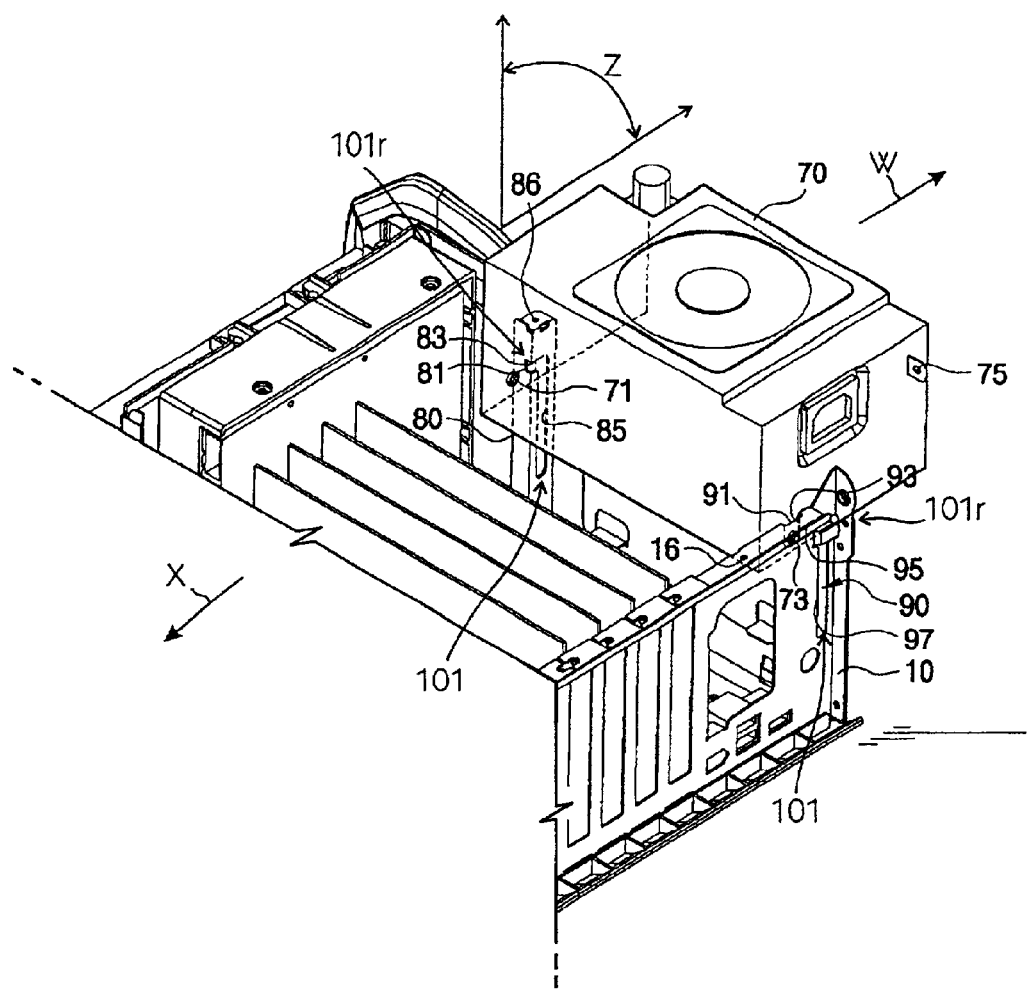
Figure 10:
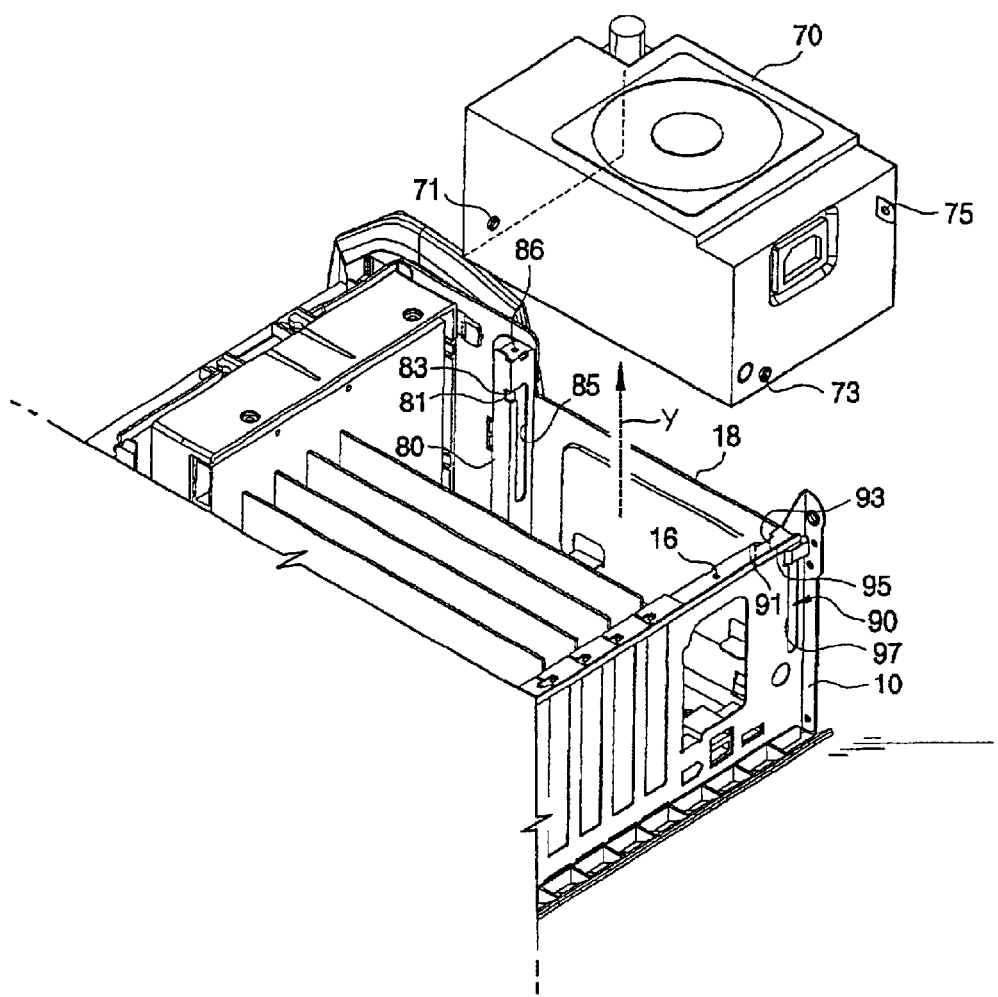

Continuing with particular reference to FIGS. 9 and 10, in order to completely remove the power supplying unit 70 from the fixed casing 10, the user moves the power supplying unit 70 to the left in the direction of arrow X (see FIG. 9), along the first and third curved sliding guides 83 and 95 of the respective first and second guiding members 80 and 90. As shown in FIG. 9, at this time the first guiding projection 71 moves from the first curved sliding guide 83 to the first entrance 81, thereby being separated from the first guiding part 80, whereas the second guiding projection 73 is moved from the third curved sliding guide 95 to the second curved sliding guide 93, thereby staying in the second guiding member 90. Thereafter, when the user moves the second guiding projection 73 of the power supplying unit 70 from the second curved sliding guide 93 to the second entrance 91, the power supplying unit 70 is, as shown in FIG. 10, completely separated from the fixed casing 10 by moving the power supplying unit in the direction of arrow Y.

The process of combining the power supplying unit 70 to the fixed casing 10 is performed in an inverse order of the removing process for the power supplying unit 70. Again, with reference to FIGS. 7 through 10, first, the second guiding projection 73 of the power supplying unit 70 is inserted into the second entrance 91 of the second guiding member 90, and moved in a downward direction opposite to the direction of arrow Y of FIG. 10, thereby allowing the second guiding projection 73 to move down to the end of the second curved sliding guide 93.

Then, the first guiding projection 71 of the power supplying unit 70 is inserted into the first guiding entrance 81 of the first guiding member 80, and the power supplying unit 70 is set at the released position 101r. At this time, a user connects the power cables 72 (FIG. 5) of the power supplying unit 70 to corresponding hardware components, such as the main board 15, in order to supply electric power to the respective components. Thereafter, the user inwardly turns the power supplying unit 70 on the first and second guiding projections 71 and 73 through the predetermined angle Z, such as by 90°, in an opposite or counterclockwise direction to the direction of movement through the predetermined angle Z for releasing the power supplying unit 70.

Continuing with reference to FIG. 7 through 10, the user then moves the power supplying unit 70 to the right or in the direction of the arrow W (see FIG. 9) along the first and third curved sliding guides 83 and 95, and moves the power supplying unit 70 to the combining position 101 along the first and second sliding guides 85 and 97. Finally, the user fixes the fastening brackets 75 of the power supplying unit 70 to the respective screw apertures 16 and 86 of the fixed casing 10 using the fastening means, such as the fastening screws 100, thereby fastening the power supplying unit 70 to the casing 3.

In the above description, the power supplying unit 70 is fastened by means of the fastening brackets 75 of the power supplying unit 70 and the fastening means, such as fastening screws 100, and the screw apertures 16 and 86 of the fixed casing 10. However, the power supplying unit 70 can also be fastened by being supported onto the inside of the movable casing 20 without using the fastening brackets 75 and the screw apertures 16 and 86, such as by a suitable fastening means of fastening arrangement as, for example, a selectively engageable and releasable clip and retainer arrangement, with the clip and the retainer for the clip being respectively located on the power supplying unit 70 and the fixed casing 10, for example.

Also, in the above description, the second guiding member 90 is formed on the plate 10f of the fixed casing 10. However, the second guiding member 90 can also be separately made by an injection molding process, similar to a process for forming the first guiding member 80.

Additionally, in the above description of the combining arrangement D of the computer system C, the first guiding member 80 includes the first curved sliding guide 83, which includes the stopper 83a or stopper arrangement S, and the first sliding guide 85, and the second guiding member 90 includes the second and third curved sliding guides 93 and 95 including stopper 95a, as providing a stopper arrangement S, and the second sliding guide 97.

Figure 11:
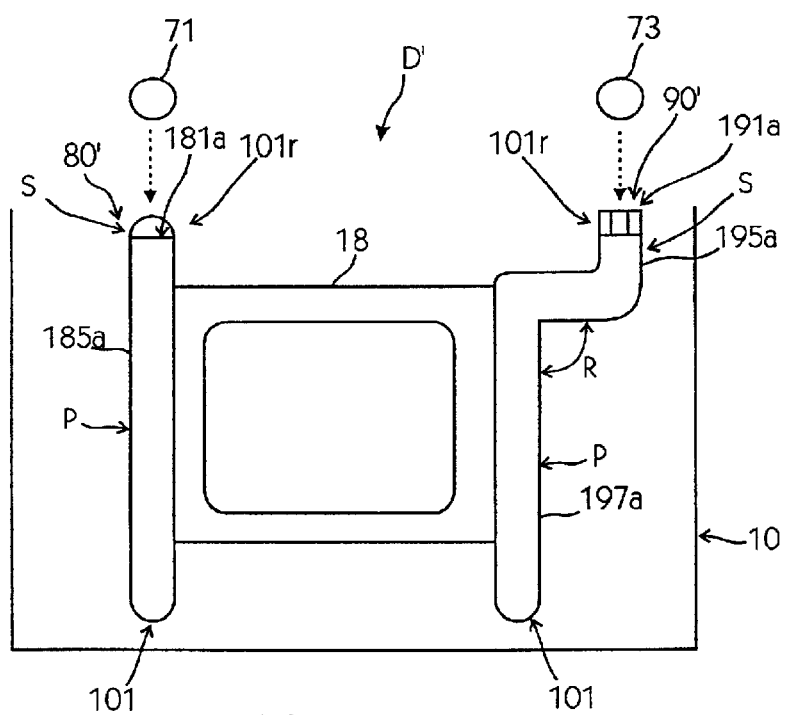
FIGS. 11 and 12 respectively are diagrammatic illustrations of other embodiments of a combining structure of the computer system of FIG. 3 according to the present invention.

However, alternatively, referring to the diagrammatic illustration of FIG. 11 in a combining arrangement D' of the computer system C according to the present invention, one of the two guiding members 80' includes an entrance 181a and an elongated aperture 185a, including a stopper arrangement S, along the traveling path P of the power supplying unit 70 into which is inserted the guiding projection 71 of the power supplying unit 70. In this case, the other guiding member 90' includes a curved sliding guide 195a providing a stopper arrangement S connecting to an entrance 191a through which the guiding projection 73 of the power supplying unit 70 is respectively inserted, and a sliding guide 197a which is at a predetermined angle R with respect to the curved sliding guide 195a and which guides the power supplying unit 70 to the combining position 101. Thus, one guiding projection, such as guiding projection 71, is first inserted into entrance 181a and then into the elongated aperture 185a, and then the other guiding projection 73 is inserted into the entrance 191a. Thereafter, the other guiding projection 73 is moved along the curved sliding guide 195a, and if then the power supplying unit 70 is moved to the combining position 101 along the sliding guide 197a and the elongated aperture 185a. In addition to the above shapes, the first and second guiding members can be of other various shapes or configurations, dependent upon the particular use or application in a computer system, such as computer system C, according to the present invention Further, in the above description of the guiding arrangement D, such as illustrated in FIG. 6, of the computer system C according to the present invention, the first guiding member 80 includes one curved slot, the first curved sliding guide 83, and the second guiding member 90 includes a plurality of curved slots, namely two curved slots, the second and third curved sliding guides 93 and 95 to provide a stopper arrangement S.

Figure 12:
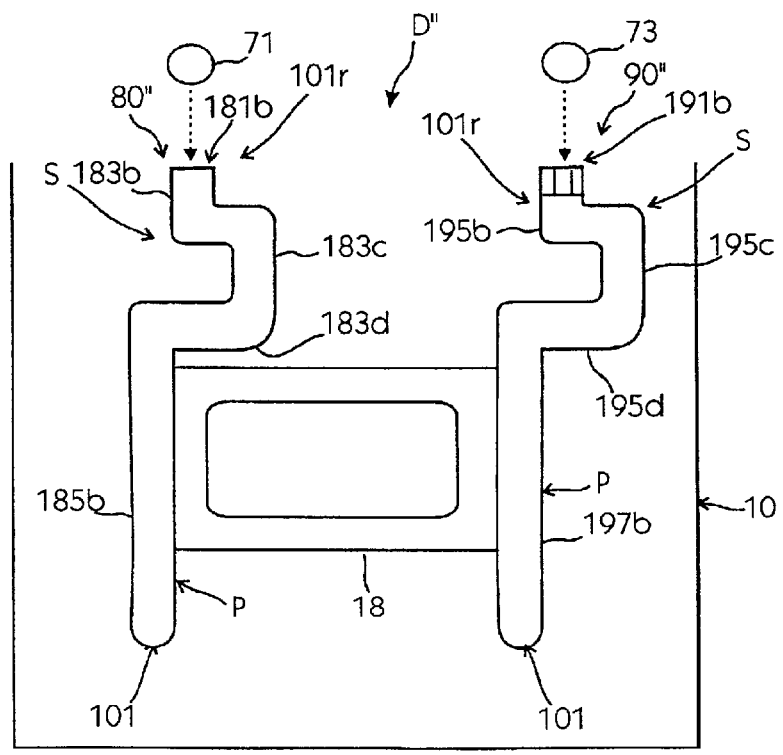

However, alternatively, referring to the diagrammatic illustration of FIG. 12 in a combining arrangement D" of the computer system C according to the present invention, the first and second guiding members 80" and 90" either or both can include a plurality of curved slots. As illustrated in FIG. 12, for example, the guiding member 80" includes an entrance 181b and a plurality of curved guides or slots 183b, 183c and 183d, and the guiding member 90" includes an entrance 191b and a plurality of curved guides or slots 195b, 195c, and 195d. These curved slots or guides 183b, 183c, 183d, 195b, 195c, 195d respectively form the stoppers or stopper arrangements 1 for the respective guiding projections 71 and 73 of the power supplying unit 70. Therefore, for example, the guiding projection 71 enters entrance 181b and then enters the curved guide 183b, and the guiding projection 73 enters the entrance 191" and proceeds to curved guide 195b, the guiding projection 71 proceeds through curved guides 183b, 183c, and 183d to and then along sliding guide 185b along travelling path P to the combining position 101, and the guiding projection 73 proceeds through curved guides 195b, 195c and 195d to and then along sliding guide 197b along travelling path P to the combining position 101.

As described above, the power supplying unit 70 includes the pair of guiding projections 71, 73, and the fixed casing 10 includes the pair of guiding members 80, 80', 80", 90, 90', 90", respectively, accommodating respectively the pair of guiding projections 71 and 73 and guiding the power supplying unit 70 to the combining position 101, so that hardware components of a computer system, such as the main board 15 of computer system C, can advantageously be easily inspected, upgraded, repaired, and cabled, for example.

Therefore, as described above, the present invention provides a computer system including a combining structure or combining arrangement for a power supplying unit, in which hardware components can be easily cabled, exchanged, and repaired.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A combining structure, comprising:
   a pair of guiding members each including a sliding guide adapted to selectively guide a power supply unit, the pair of guiding members each respectively accommodating one of a pair of guiding projections of the power supply unit;
   a stop arranged in at least one of the guiding members to prevent the power supply unit from translating beyond a released position of the power supply unit and separating from a casing of a computer system; and
   a supporter adapted to support the power supply unit when the casing of the computer system is in an open position and the power supply unit has been rotated through a predetermined angle while said power supply unit is in said released position, wherein said power supply unit is arranged to be removable from said casing by sliding the pair of projections out of ends of the pair of guiding members.

2. The combining structure of claim 1, wherein the stop comprises a curved portion of the sliding guide of at least one of the pair of guiding members arranged at the released position of the power supply unit.

3. The combining structure of claim 1, wherein the stop comprises a slot arranged in the sliding guide of at least one of the pair of guiding members.

4. The combining structure of claim 1, herein said power supply unit is arranged to be supported by an upper end of a wall on an edge of said casing of said computer system.

5. The combining structure of claim 1, wherein each of said pair of guiding members have an "L" shape allowing said power supply unit to move in a horizontal direction after being moved in said vertical direction.

6. The combining structure of claim 1, wherein said stop is arranged at an uppermost point on one of said pair of guiding members.

7. The combining structure of claim 1, wherein the stop comprises of a plurality of slots arranged in the sliding guide of at least one of the pair of guiding members.

8. A combining structure, comprising:
   a pair of guiding members each including a sliding guide adapted to selectively guide a power supply unit, the pair of guiding members each respectively accommodating one of a pair of guiding projections of the power supply unit;
   a stop arranged in at least one of the guiding members to prevent the power supply unit from translating beyond a released position of the power supply unit and separating from a casing of a computer system; and
   a supporter adapted to support the power supply unit when the casing of the computer system is in an open position and the power supply unit has been rotated through a predetermined angle while said power supply unit is in said released position, wherein said pair of guiding members are open at one end to allow said pair of projections on said power supply to be removed from said guiding members.

9. The combining structure of claim 8, wherein the stop comprises a curved portion of the sliding guide of at least one of the pair of guiding members arranged at the released position of the power supply unit.

10. The combining structure of claim 8, wherein the stop comprises a slot arranged in the sliding guide of at least one of the pair of guiding members.

11. The combining structure of claim 8, wherein said power supply unit is arranged to be supported by an upper end of a wall on an edge of said casing of said computer system.

12. The combining structure of claim 8, wherein each of said pair of guiding members have an "L" shape allowing said power supply unit to move in a horizontal direction after being moved in said vertical direction.

13. A combining structure, comprising:
   a pair of guiding members each including a sliding guide adapted to selectively guide a power supply unit, the pair of guiding members each respectively accommodating one of a pair of guiding projections of the power supply unit, the pair of guiding members being arranged in a vertical direction to allow said power supply unit to translate in a vertical direction from a mounted position to a released position;
   a stop arranged in at least one of the guiding members to prevent the power supply unit from translating beyond said released position of the power supply unit and separating from a casing of a computer system; and
   a supporter adapted to support the power supply unit when the casing of the computer system is in an open position and the power supply unit has been rotated through a predetermined angle while said power supply unit is in said released position, wherein the stop comprises a curved portion of the sliding guide of at least one of the pair of guiding members, the curved portion of the sliding guide being curved a plurality of tunes at the released position of the power supply unit.

14. A method for moving a power supply unit in a computer casing, the method comprising:

translating the power supply unit in a direction from a mounted position to a second position, moving a pair of guiding projections on said power supply unit along a pair of guiding members attached to said computer casing;

rotating said power supply unit to rotate said guiding projections within said guiding members; and translating said power supply unit after said rotating to separate the power supply unit from the computer casing by moving said guiding projections out of openings at respective ends of the guiding members to fully separate said power supply unit from the computer casing.

15. The method of claim 14, further comprising keeping said power supply unit stationary and in a fixed position by supporting said power supply unit with a supporter arranged to be in contact with an entire width of a side of the power supply unit between said rotating and said translating after said rotating.

16. The method of claim 15 further comprising said power supply unit being rotated and translated a plurality of times with said guiding projections arranged in said guiding members before said power supply unit is in the fixed position and being supported by the supporter.

17. The method of claim 14 further comprising releasing fasteners arranged to fix said power supply unit to said computer casing prior to translating the power supply unit in a vertical direction.

18. The method of claim 14, further comprising said power supply unit being translated and rotated a plurality of times with said guiding projections arranged in said guiding members prior to separating said power supply unit from said computer casing.

19. The method of claim 14, comprising resting said power supply unit onto a supporter after rotating said power supply unit and before separating said power supply unit from the computer casing.

* * * * *